United States Patent [19]

Wittkopp et al.

[11] 4,211,129
[45] Jul. 8, 1980

[54] METHOD FOR PRODUCING A BORE

[75] Inventors: Helmut Wittkopp, Erkelenz; Heinz vom Dorp; Theodor Lindgens, both of Monchen-Gladbach, all of Fed. Rep. of Germany

[73] Assignee: W. Hegenscheidt Gesellschaft mbH, Erkelenz, Fed. Rep. of Germany

[21] Appl. No.: 951,075

[22] Filed: Oct. 13, 1978

[30] Foreign Application Priority Data

Oct. 26, 1977 [DE] Fed. Rep. of Germany ....... 2747883

[51] Int. Cl.² ................. B23B 3/00; B23B 35/00; B23B 39/06
[52] U.S. Cl. ................. 82/1 C; 82/DIG. 1; 408/1 R; 408/13
[58] Field of Search ............ 82/1 C, 1.2, 1, 4, 8, 82/DIG 1; 408/1, 13

[56] References Cited

U.S. PATENT DOCUMENTS

| | | | |
|---|---|---|---|
| 2,670,528 | 3/1954 | Brunberg | 82/DIG. 1 |
| 3,236,124 | 2/1966 | Rhoades | 82/DIG. 1 |
| 3,303,731 | 2/1967 | Zawistowski | 82/DIG. 1 |
| 4,096,770 | 6/1978 | Tanner | 82/1 C |

FOREIGN PATENT DOCUMENTS 861335 2/1961 United Kingdom ................ 82/DIG. 1

Primary Examiner—Harrison L. Hinson
Attorney, Agent, or Firm—W. G. Fasse; D. F. Gould

[57] ABSTRACT

The present method relates to finish boring of prebored bores in a work piece such that an operative fit with a counterpart or further work piece is achieved. The finishing of the bore may be accomplished independently of the instantaneous temperature of the work piece and of the counterpart by operating a tool carriage, for example, on a lathe, with a stepping motor controlled by a correction value computer which generates a control signal in response to a temperature difference between the work piece temperature and a reference temperature. The reference temperature may be that of the further work piece.

2 Claims, 2 Drawing Figures

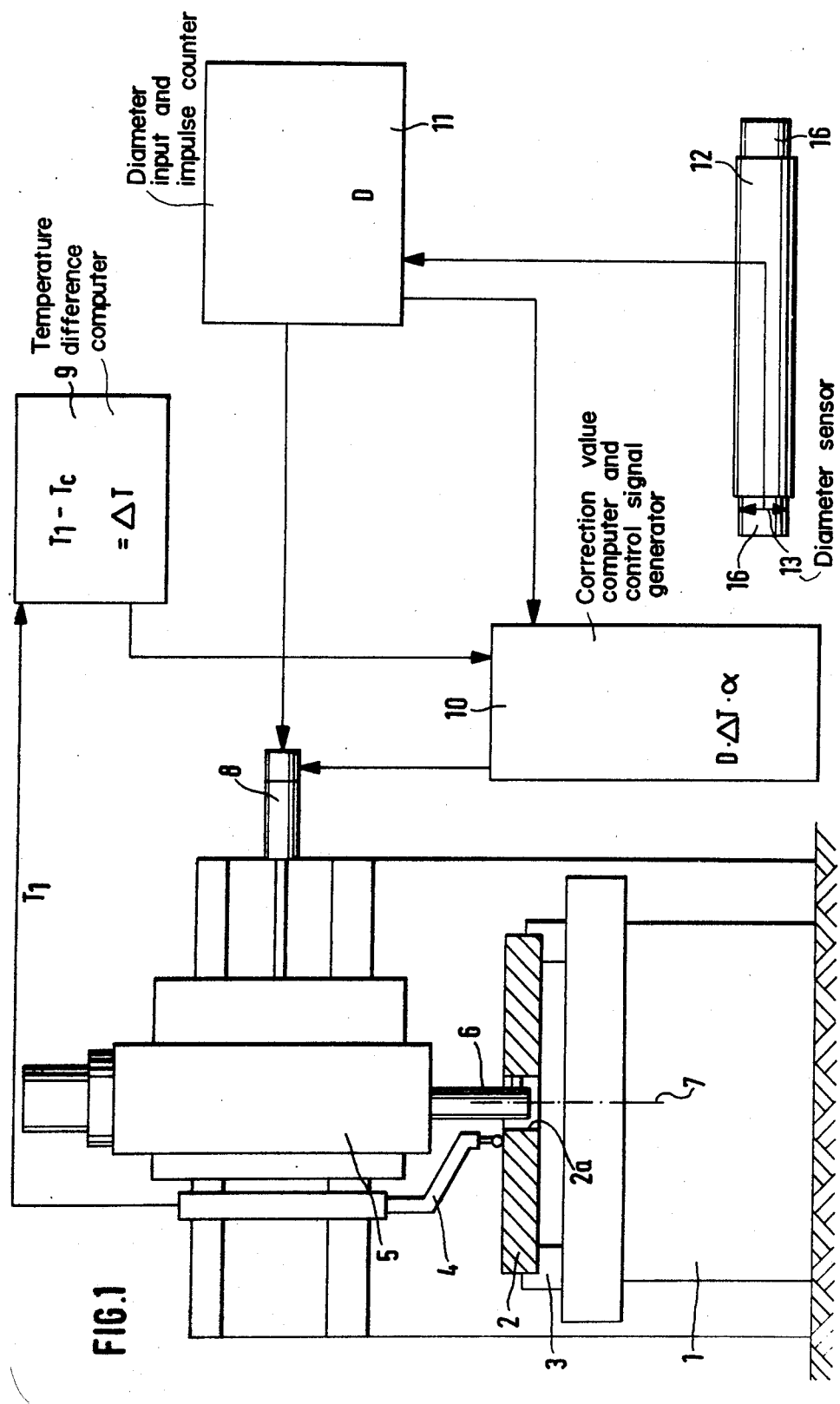

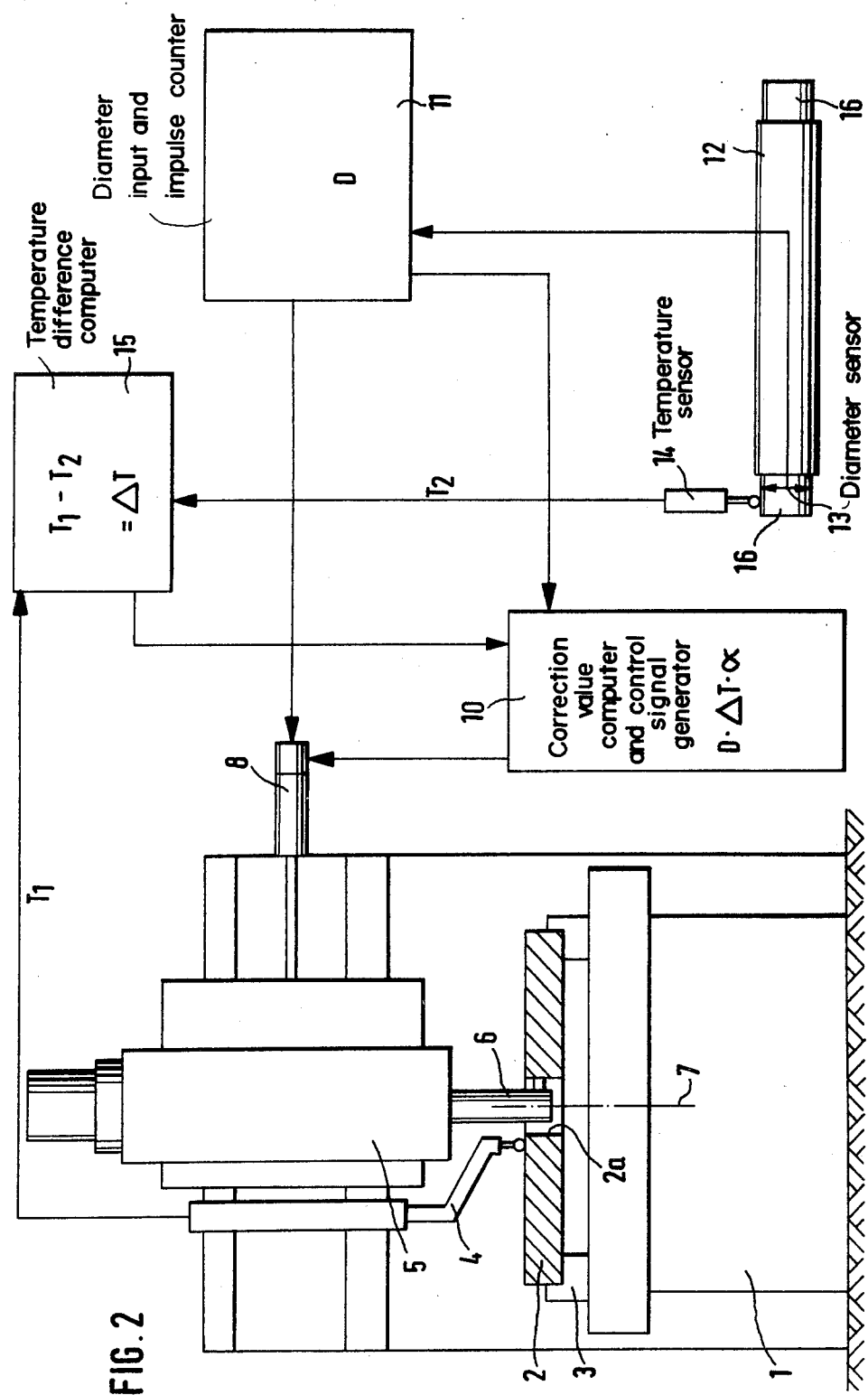

METHOD FOR PRODUCING A BORE

BACKGROUND OF THE INVENTION

The invention relates to a method for producing a bore in work pieces which have already been prebored, especially for producing the hub bore in prebored railroad wheels.

The production or rebuilding of wheel sets, such as railroad wheel sets, requires uniting both of the wheel disks with the axle to assemble the wheel set. To accomplish this, it is necessary that both hub seats of the axle or shaft and the hub bore in each wheel disk have very specific, correlated diameters for cooperating with one another in an operatively fitted manner. Thus, the dimensions of the mentioned diameters must be accomplished with a high degree of precision, in order to assure the functioning of the desired fitting.

When producing the wheel disks of a railroad wheel set, the entire outer surface of the wheel disks is machined by cutting, whereby the work piece is heated substantially. The last step of the machining is to bore out the hub bore to an operatively fitting dimension. For this purpose, the finish machining of the hub bore must occur at the end of the entire operation, so that damage to the outer surface of the bore, e.g., by chips, is avoided. The boring tool is moved to the desired operatively dimensioned diameter, for example, by means of a numerically controlled carriage or support. During such finish machining the work piece has the very high temperature originating from the rough machining. If the bore of the warm work piece is now bored out with this tool setting, then the bore would be too small after the work piece has cooled down to room temperature or to an operating temperature. If the wheel disk is assembled with the axle while the wheel disk is still in a heated condition, the wheel disk would be subject to such high internal stresses, due to the subsequent cooling, that it would crack after a short time of operation.

The only possible way to avoid these disadvantages according to the prior art, is to allow the work pieces to cool off to room temperature, and only then to do the finish machining. However, this requires costly floor space for an intermediate storing. Consequently, the work pieces are sometimes stored intermediately outside in the stock yard or in an unheated shed section. The machined axles, however, do not require intermediate storing because they do not heat up as much as the wheel disks. Hence, the wheel disks may be cooled off too much for machining immediately after the intermediate storing period, especially during colder seasons or in colder areas of the globe. The wheel disks have a temperature, which is well below the axle or shaft temperature, since the axles have been exclusively in a heated hall. A machining of the wheel hub bore is also not possible in this condition, because a correct operatively fitting dimension may not be attained under these conditions. The proper fit would loosen as a result of heating of the wheel disk or a cooling of the axle.

OBJECTS OF THE INVENTION

In view of the above it is the aim of the invention to achieve the following objects singly or in combination:

to provide a process for producing a precise bore in a work piece, especially the hub bore of a railroad wheel;

to produce the precise bore diameter independently of the temperature of the work piece delivered for machining;

to substantially avoid, by means of a proper fit, temperature shrinking and the resulting stresses where wheels are assembled on axles;

to avoid the delays encountered heretofore due to cooling the work pieces between an initial rough machining and a finish machining;

to control the machining operation with due regard to the temperature differences between the work pieces to be assembled; and to avoid loosening or cracking of wheel disks assembled on axles.

SUMMARY OF THE INVENTION

According to the present process the temperature of the work piece to be machined, is determined in the area of the bore directly before the finish machining, the difference with respect to a reference temperature is formed, and the position of the tool is corrected depending on the size and sign (plus or minus) of this temperature difference which is used to form a control signal. The boring tool, according to the above teaching is thus moved radially by an extent which corrects the position of the tool and corresponds to the amount of bore wall displacement caused by the temperature difference with respect to the reference temperature. The direction of the correction is determined by the sign of the temperature difference, that is, the direction depends on whether the work piece temperature falls above or below the reference temperature.

A further embodiment of the invention teaches that the existing temperature of the finish machined operatively fitting counterpart work piece is used as the reference temperature. This feature has the advantage that the operatively fitting counterpart work piece does not need to have a very specific, constantly maintained temperature which may be used as the reference temperature. In other words, the reference temperature does not need to be constant, rather the counterpart provides the reference temperature itself and may thus be supplied to the machining operation with any arbitrary temperature.

BRIEF FIGURE DESCRIPTION

In order that the invention may be clearly understood, it will now be described, by way of example, with reference to the accompanying drawings, wherein:

FIG. 1 shows a block diagram illustrating an apparatus for performing the boring process of the invention; and FIG. 2 shows a block diagram similar to that of FIG. 1 for performing a modified embodiment of the process of the invention.

DETAILED DESCRIPTION OF PREFERRED EXAMPLE EMBODIMENTS ILLUSTRATING THE BEST MODE OF THE PRESENT INVENTION

FIG. 1 shows a work piece 2 mounted in a chuck 3 of a turning machining 1. The work piece 2 has a centrally arranged bore 2a, which is to be finish-bored to an operatively fitting dimension. Such machining is to be accomplished, for example, with a boring tool 6 which is held in a radially displaceable turning support 5 which may, for example, be radially displaced by means of a stepping motor 8. For manufacturing the required operatively fitting dimension of the bore 2a, the hub seat 16 of the shaft 12 is first measured by means of a diameter measuring device 13. The desired operative, fitting bore diameter corresponding to this seat diameter is fed into the machine by means of a diameter input device 11 in a manner known as such.

The determination whether the desired bore diameter has been reached is ascertained, for example, by counting the impulses supplied to the stepping motor 8 starting from the designated zero position. In this instance the zero position is the machine center 7. The stepping motor 8 is then stopped by the diameter input 11, when the number of impulses corresponding to the desired diameter dimension has arrived or has been supplied. When the boring tool 6 reaches, in this manner, the corresponding diameter position, the work piece temperature T1 is measured in the immediate vicinity of the bore 2a by means of the temperature sensor 4. The thus measured work piece temperature T1 is then fed to a temperature difference computer 9 which determines the temperature difference ΔT relative to a given reference temperature Tc, for example, the normal temperature of the environment. The computer 9 also indicates by a sign (+ or −) whether the absolute value of the calculated temperature difference ΔT exceeds the reference temperature Tc or whether the temperature difference fell below the reference temperature. The size of the temperature difference ΔT with its proper sign plus or minus is now fed into a correction value computer 10. The diameter value from the diameter input 11 is also supplied to the corresponding value computer 10. The required thermal expansion coefficient α is permanently stored in the correction computer 10.

The correction computer 10 calculates a correction value D·ΔT·α from the above mentioned data to provide a control signal for the stepping motor 8. The correction value computer 10 in providing the control signal, takes the sign (+ or −) of the correction value or temperature difference into account. The stepping motor 8 continues to run until the number of impulses corresponding to the correction value, is reached and counted by a respective impulse counter whereupon the stepping motor 8 is stopped.

Basically, the counting of the impulses for driving the stepping motor 8 may be done at any desired location. Preferably, however, the pulses are counted at the diameter input device 11, because an appropriate counter must be present at this input device 11 in any event for the control of the incoming impulses for the diameter adjustment. For this purpose a feed-back signal must be provided from the stepping motor 8 to the diameter input 11. In addition, the calculated correction value must be supplied by the correction value computer 10 to the counter in the diameter input device 11. In other words, the correction value presets the counter for counting a number of pulses corresponding to the correction value and said feedback signal provides the pulses to be counted until the preset number is reached. The correction value to be calculated is that quantity by which the radius of the finished bore 2a is larger at the temperature T1 than at the temperature Tc or that quantity by which the radius is smaller at the temperature Tc if T1 is smaller than Tc.

Thus, if the work piece temperature T1 is higher than the reference temperature Tc, the turning support 5 after the actual diameter positioning by means of the diameter input device 11 is driven radially outwardly to an extent corresponding to the correction value as calculated by the correction value computer 10. If the work piece temperature T1 is lower than the reference temperature Tc, then the turning support 5 after the actual diameter positioning by means of the diameter input 11, is driven further inwardly also to an extent corresponding to a correction value calculated by the correction value computer 10.

Since the finish machining of the bore 2a takes up very little time, the temperature change of the work piece 2 during this machining need not be considered.

When the present method is performed by an apparatus according to FIG. 2 substantially the same operation takes place as described above with reference to FIG. 1. However, according to FIG. 2, the reference temperature Tc is not chosen at random. Rather, the reference temperature Tc is determined by means of the temperature sensor 14 as the actual temperature T2 of the hub seat 16 and fed to a difference calculator 15 as T2. The required operatively fitting dimensions may thus be produced with high precision according to this embodiment of the invention, completely independent of the thermal condition of the work pieces to be assembled.

The temperature T2, which is the actual temperature of the other work piece 12 forming a fitting counter part to the first mentioned work piece 2, is used as reference temperature. All other process steps do not differ from those which were described above with reference to FIG. 1.

With this invention it is possible for the first time, to produce desired high precision dimensions on work pieces, independently of the thermal condition of the work pieces and without intermediate storing.

The present method may be performed by using the following conventional devices in a circuit arrangement as shown in FIGS. 1 and 2.

| Item | Ref. No. | Manufacturer | Model No. |
| --- | --- | --- | --- |
| temperature difference computer | 9, 15 | Digital Equipment | pdp 8 |
| correction value computer and control signal generator | 10 | Digital Equipment | pdp 8 |
| diameter input device | 11 | Siemens | Sinumerik 7T |
| diameter sensor | 13 | Hegenscheidt GmbH | Meβmaschine Type 540 |
| temperature sensor | 4, 14 | Ahlborn Meβ- C. Regeltechnik | LC 8 4 and Therm 4500 |
| turning machine | 1 | Hegenscheidt GmbH | RQ |
| stepping motor | 8 | Inland | TT5302 |

Although the invention has been described with reference to specific example embodiments, it is to be understood that it is intended to cover all modifications and equivalents within the scope of the appended claims.

What is claimed is:

1. A method for producing a finish dimension of a prebored bore in a work piece, comprising the steps of: measuring the temperature in the immediate vicinity of said prebored bore directly prior to the finish machining to provide a measured temperature value representing the temperature of the prebored work piece directly before the finish machining; providing a reference temperature value; determining the difference temperature between said measured temperature value and said reference temperature value, determining the sign (positive or negative) of said difference temperature, producing a tool positioning control signal from the difference temperature and its sign, and correcting the position of a finishing tool solely in response to said control signal to provide said bore with a smooth, uninterrupted finish surface of the correct size.

2. The method of claim 1, comprising the additional step of measuring the temperature of a further work piece intended for assembly with said first mentioned work piece and using this temperature of said further work piece as said reference temperature.

* * * * *